(12) United States Patent
Tabirian et al.

(10) Patent No.: US 7,541,588 B2
(45) Date of Patent: Jun. 2, 2009

(54) INFRARED LASER ILLUMINATED IMAGING SYSTEMS AND METHODS

(75) Inventors: Anna M. Tabirian, Winter Park, FL (US); Douglas P. Stanley, Longwood, FL (US); David E. Roberts, Apopka, FL (US); Carl S. King, Apopka, FL (US); Arthur B. Thompson, Altamonte Springs, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 287 days.

(21) Appl. No.: 11/179,856

(22) Filed: Jul. 12, 2005

(65) Prior Publication Data

US 2007/0221849 A1 Sep. 27, 2007

(51) Int. Cl.
*G01C 3/08* (2006.01)
(52) U.S. Cl. .................................... 250/341.1
(58) Field of Classification Search .............. 250/341.1; 356/4.01
See application file for complete search history.

(56) References Cited

U.S. PATENT DOCUMENTS

| | | | |
|---|---|---|---|
| 4,497,065 A * | 1/1985 | Tisdale et al. ............... 382/103 |
| 5,144,630 A | 9/1992 | Lin | |
| 5,282,013 A * | 1/1994 | Gregoris .................... 356/4.07 |
| 5,400,173 A | 3/1995 | Komine | |
| 5,408,099 A * | 4/1995 | Barr et al. ................. 250/341.8 |
| 5,451,785 A * | 9/1995 | Faris .......................... 250/330 |
| 5,847,816 A * | 12/1998 | Zediker et al. ............. 356/5.09 |
| 6,323,941 B1* | 11/2001 | Evans et al. ................ 356/4.01 |
| 6,724,467 B1* | 4/2004 | Billmers et al. ............ 356/5.04 |
| 6,826,358 B2* | 11/2004 | Partynski et al. .............. 396/7 |
| 6,882,409 B1* | 4/2005 | Evans et al. ................ 356/4.01 |
| 2002/0044674 A1 | 4/2002 | Pavlidis | |
| 2004/0004707 A1* | 1/2004 | DeFlumere ................ 356/4.01 |
| 2005/0068517 A1* | 3/2005 | Evans et al. ................ 356/5.01 |
| 2006/0165134 A1* | 7/2006 | Tabirian et al. ................ 372/6 |

FOREIGN PATENT DOCUMENTS

| | | |
|---|---|---|
| EP | 0363735 | 4/1990 |
| EP | 1615051 | 1/2006 |
| FR | 2741722 | 5/1997 |

OTHER PUBLICATIONS

International Search Report for EP Application No. 06252975.5 dated Jun. 18, 2007.

* cited by examiner

*Primary Examiner*—David P Porta
*Assistant Examiner*—Djura Malevic
(74) *Attorney, Agent, or Firm*—Alston & Bird LLP

(57) ABSTRACT

Systems and methods for long range recognition and identification of objects and targets, and, more particularly, to long range imaging systems that include the use of mid-wave infrared laser illumination technology are provided. In particular, mid-wave infrared laser illuminated imaging systems and methods are disclosed for addressing, among other things, the problems associated with long range, day or night observations of targets through various obscurants (e.g., fog, haze, rain, smoke). Such systems may be configured to operate in either a single, active illumination mode or in a dual, active/passive mode.

6 Claims, 8 Drawing Sheets

INFRARED LASER ILLUMINATED IMAGING SYSTEMS AND METHODS

FIELD OF THE INVENTION

Embodiments of the present invention relate generally to long range recognition and identification of objects and targets and, more particularly, to long range imaging systems that include the use of mid-wave infrared laser illumination technology.

BACKGROUND OF THE INVENTION

Long range observation of objects and targets has been the topic of military and civilian system development for many years, for applications ranging from weapon targeting to aircraft/spacecraft flight control/safety operations, including the detection of wires, obstacles and other hazards for helicopter and other manned air vehicles as well as unmanned air vehicle (UAV) operation. The goal of such systems typically involves detection, recognition, and identification of objects or targets at ranges which are sufficiently long such that action can be taken based on the observation in a timely manner to achieve a desired goal—e.g., control aircraft flight along a safe path, direct munitions onto a hostile vehicle. Key attributes of such systems generally include the following: operation under all target/environment conditions—including total darkness and near-zero thermal contrast; operation in the presence of obscurants (e.g., fog, smoke, rain, haze); and operation over long ranges to provide sufficient time for operators to react in a timely manner to achieve their missions before disruption is caused by the object under observation.

A broad range of system and component technologies have been developed to address long range target identification, including passive, visible and near-infrared wavelength sensors; active, visible and near-infrared wavelength sensors; and passive mid-wave infrared (MWIR) and long-wave infrared (LWIR) sensors. In the case of passive, visible and near-infrared wavelength sensors, using well-developed CCD or CMOS cameras, sometimes in conjunction with special photocathodes in electron-multiplication schemes, this approach has been very successful in providing high resolution imagers for many applications. The short operating wavelengths (typically in small individual spectral bands within the wavelength range from 0.5 to 1.5 micrometers) provide excellent resolution with small diameter optics, and unit prices are low, reflecting the maturity of the technologies. Unfortunately, the usefulness of most of these systems degrades dramatically under conditions of reduced visibility, as occurs in darkness or in the presence of obscurants such as haze, smoke, rain, or fog.

Alternatively, with active, visible and near-infrared wavelength sensors, considerable performance enhancements may be obtained by using a time-gated visible or near-infrared wavelength sensor in conjunction with a short-pulse laser having a short wavelength within these spectral regions. By turning the camera on for only brief periods, corresponding to the particular time interval around which the laser pulse returns from the target, a freeze-frame flash photograph of the object is obtained. The contrast-reducing effects of bulk atmospheric backscatter are reduced dramatically and image clarity is correspondingly enhanced, allowing extended range operation. Observation in total darkness is relatively easily achieved, and penetration of obscurants (e.g., fog, smoke, rain, haze) is somewhat enhanced over purely passive systems by gating out much of the optical noise in the images. However, range limitations due to atmosphere attenuation of the laser wavelengths in strongly obscured environments prevent these systems from effective use in many situations.

In the case of more general, passive MWIR and LWIR sensors, using thermal cameras of varying designs (e.g., scanned single detector or arrays, staring arrays; InSb, HgCdTe, or silicon microbolometer materials), systems in this category can provide capability for viewing objects in total darkness and through most obscurants. The former benefit results from the fact that the targets being viewed inherently emit infrared radiation; the latter benefit derives from the relatively good transmissions of many infrared wavelengths through typical obscurants. Unfortunately, the long wavelengths at which such passive systems typically operate requires optics that scale in volume roughly as the cube of the wavelength. The resultant growth often makes such systems too large or expensive for desired applications. Additionally, the thermal contrast between targets and their backgrounds typically degrades dramatically several times during a normal diurnal cycle, making objects difficult to detect, recognize, and identify.

Unfortunately, none of these systems simultaneously provides all of the features desired in a long-distance imaging system. Therefore, an unsatisfied need exists in the art for improved systems and methods that are capable of achieving long range imaging of targets under day or night conditions in the presence of various obscurants, such as smoke, haze, rain, or fog.

BRIEF SUMMARY OF THE INVENTION

Embodiments of the present invention provide improved systems and methods that are capable of achieving long range imaging of targets under day or night conditions in the presence of various obscurants, such as smoke, haze, rain, or fog. In particular, mid-wave infrared laser illuminated imaging systems and methods are disclosed for addressing, among other things, the problems associated with long range, day or night observations of targets through various obscurants (e.g., fog, haze, rain, smoke). Long-range imaging systems and methods implemented in accordance with embodiments of the present invention may be configured to operate in either a single, active illumination mode or in a dual, active/passive mode.

In one embodiment, a system for observing objects at long ranges, including under conditions of darkness and in the presence of obscurants, is disclosed that includes: a laser for illuminating the object with a signal from within a mid-wave infrared spectral region, such as a signal having a wavelength of 3 to 5 microns; a mid-wave imaging camera for collecting imaging data of the object in the mid-wave infrared spectral region; and a controller for coordinating operations associated with one or more of the laser and the imaging camera.

The controller of one embodiment may be capable of coordinating the operations of the imaging camera to capture both imaging data that is responsive to illumination of the object by the signals provided by said laser in an active mode of operation and imaging data associated with the object that is independent of illumination of the object by the signals provided by said laser in a passive mode of operation. In addition, the system can include a display device for displaying an image of the object. The image displayed by the display device may be concurrently comprised of imagery data collected while in both the active and passive modes of operation. In addition, the display device may visually distinguish those features of the image that are based on imagery data collected in the active mode of operation from those features that are based on imagery data collected in the passive mode of operation, thereby providing more robust information relating to the object.

The system may also include a range receiver for determining the distance to the object, such as a mid-wave infrared detector configured to measure the time-of-flight of one or more pulses between the laser, the object and the imaging camera. The system may also include a gated camera for capturing imaging data only during a time interval when signals emitted by the laser and reflected by the object are incident upon the camera as determined, for example, by the range receiver.

In another aspect, a method of observing objects at long ranges, including under conditions of darkness and in the presence of obscurants, is disclosed that includes: illuminating the object with one or more signals in a mid-wave infrared spectral region; collecting imaging data of the object in the mid-wave infrared spectral region; and generating an image of the object based on the collected imaging data.

In one embodiment, the collection of imagery data is coordinated to capture both imaging data that is responsive to illumination of the object by the signals in the mid-wave infrared spectral region in an active mode of operation and imaging data associated with the object that is independent of illumination of the object by the signals in the mid-wave infrared spectral region in a passive mode of operation. In addition, the method can display an image of the object. The image displayed may be concurrently comprised of imagery data collected while in both the active and passive modes of operation. In addition, those features of the image that are based on imagery data collected in the active mode of operation may be visually distinguished from those features that are based on imagery data collected in the passive mode of operation.

While the object may be illuminated with signals in the mid-wave infrared spectral region, other embodiments of the present invention may, instead, illuminate the object with signals in the shortwave infrared spectral region with imagery data collected from both the shortwave infrared spectral region during operation in the active mode and from the mid-wave infrared spectral region during operation in the passive mode.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As indicated above, embodiments of the present invention provide improved systems and methods that are capable of achieving long range imaging of targets under day or night conditions in the presence of various obscurants, such as smoke, haze, rain, or fog. In particular, mid-wave infrared laser illuminated imaging systems and methods are disclosed for addressing the problems associated with long range, day or night observations of targets through various obscurants (e.g., fog, haze, rain, smoke). Long-range imaging systems and methods implemented in accordance with embodiments of the presence invention may be configured to operate in either a single, active illumination mode or in a dual, active/passive mode.

Figure 1:
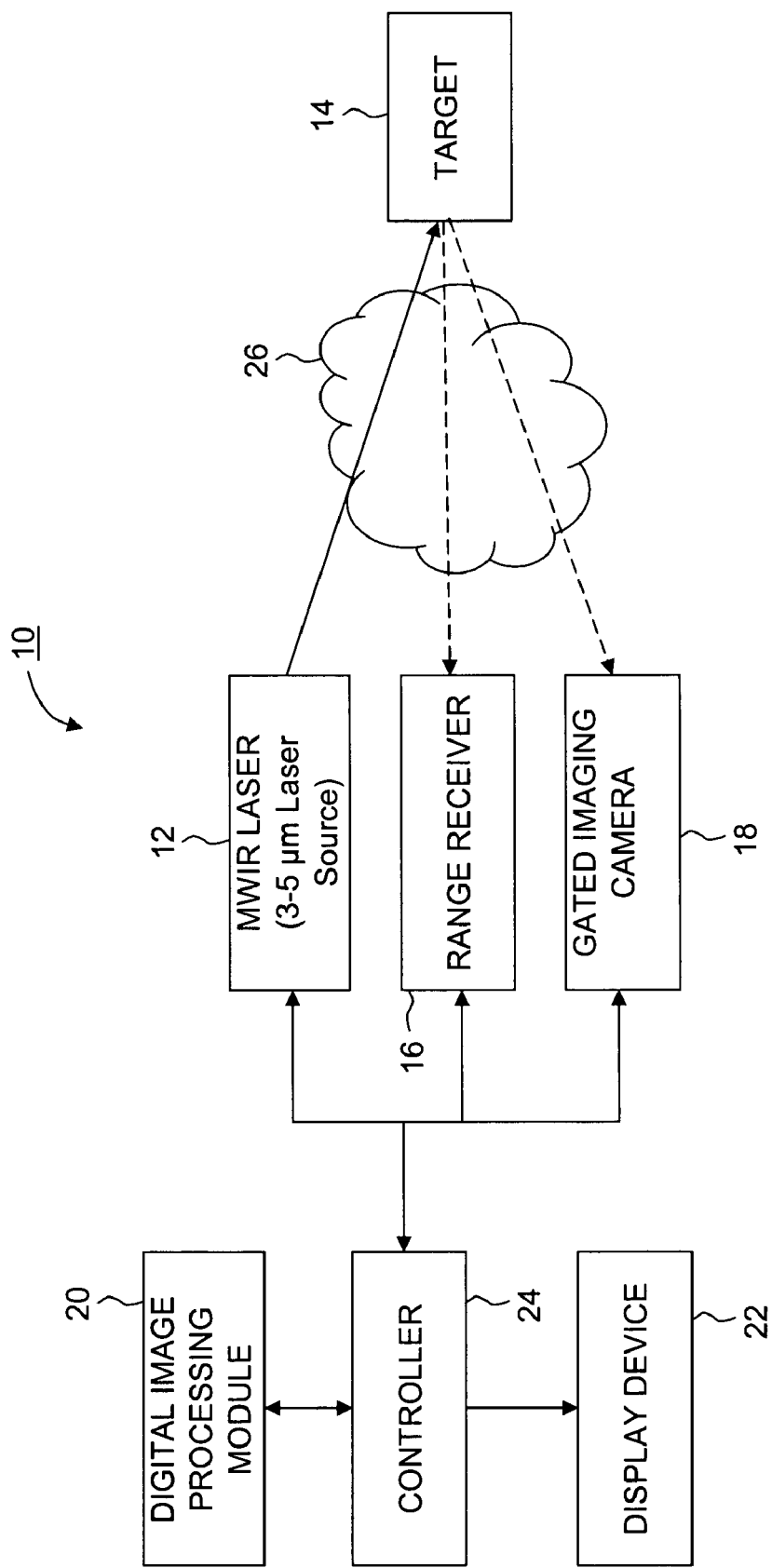
FIG. 1 shows a block diagram of a mid-wave infrared laser illuminated gated imaging system in accordance with one embodiment of the present invention.

FIG. 1 shows a high level block diagram of a mid-wave infrared (MWIR) laser illuminated gated imaging system 10 in accordance with one embodiment of the present invention. By operating in a manner as described below, the laser imaging system 10 seeks to overcome the problems of long range, day or night observation of targets through obscurants. In this embodiment, the system 10 includes a MWIR laser 12 for illuminating a target 14 with one or more pulses of light, which may need to propagate through various obscurants 26. The system 10 of this embodiment further includes a range receiver 16 for determining the range or distance to a target 14; a gated imaging camera 18 for collecting images of a target; a digital image processing module 20 for enhancing images; and a display device 22 for displaying images to a user. A controller 24 is also included for controlling or coordinating various operations associated with the functioning of the laser 12, the range receiver 16, the gated imaging camera 18, the image processing module 20 and the display device 22. The controller 24 may include interface and timing electronics, including pulse generators and digital delay timers, for coordinating the sequencing of the laser output with the range receiver and the gating of the camera to collect individual image frames.

As indicated above, illumination of the target 14 can be accomplished using a laser 12 that operates in a mid-wave infrared spectral region (i.e., in the 3-5 µm wavelength range). Although various types of lasers capable of operating in the mid-wave infrared spectral region may be employed, the laser 12 of one embodiment may be of a type that is based on $Ho^{3+}$-doped fluoride crystals: barium yttrium fluoride $BaY_2F_8$ (BYF) and lithium yttrium fluoride $LiYF_4$ (YLF). $Ho^{3+}$ doped fluoride mid-IR lasers can be incorporated in rugged, compact and inexpensive systems. They provide good beam quality and overall high efficiency while operating at room temperature. As linear down converters, Ho:BYF and Ho:YLF 3.9 µm lasers, for example, do not require high peak power (i.e., short pulse) pump lasers for efficient radiation conversion, unlike nonlinear frequency converters, such as optical parametric oscillators (OPOs) or Raman shifters. Furthermore, they lend themselves well to quasi-cw (continuous wave) or long pulse applications, allowing the scaling of these lasers to higher energies.

Thus, in one embodiment, the laser 12 can be either a Q-switched Ho:BYF or Ho:YLF laser. Q-switching or short pulse laser operation would allow the laser to be used for target discrimination relative to closely-spaced obscurants, such as targets behind camouflage nets. Operation of such lasers at typical video frame rates of 30 Hz, producing 30 mJ output pulses of 30 nsec duration, would provide illumination pulses for the gated imaging camera 18. Alternative embodiments of the present invention may include other types of mid-IR lasers, such as non-Q-switched variants of the lasers mentioned above, frequency doubled $CO_2$ lasers, Nd:YAG lasers with outputs shifted to the mid-IR using nonlinear crystals such as potassium titanyl phosphate (KTP), potassium titanyl arsenate (KTA) or periodically-poled lithium niobate (PPLN), and other lasers which are nonlinearly shifted from near- or mid-IR wavelengths into the 3-5 μm spectral range. Also, the laser may have different frame rates and may produce pulses with different energy levels and different pulse widths depending upon the application.

Use of an active system with an illumination laser to generate images using reflected light, as opposed to using the natural thermal radiation inherently emitted from objects, eliminates loss of performance during thermal washout conditions. Accordingly, by illuminating the target 14 with a MWIR laser 12, the process of imaging the target depends on differences in the mid-infrared reflectivity of the target against its background, and is not dependent on a temperature and/or emissivity differential of the target relative to its surroundings. Operation of the laser 12 in the mid-infrared spectral region—a portion of the spectral range which includes wavelengths in the 3 to 5 micron range—is very favorable from the standpoint of intrinsically low atmospheric attenuation and reasonably good transmission by most typical obscurants (e.g., fog, haze, rain, smoke).

As noted above, the system 10 also includes a range receiver 16 that can be used for determining the distance to the target 14. In one embodiment, the range receiver 16 is a high-speed, single element mid-infrared detector that may be used in conjunction with bias and threshold circuitry to measure the time-of-flight of one or more MWIR laser pulses occurring prior to the pulses used to collect imaging data. However, a variety of other range measurement approaches may be applied as well. For example, in addition to the conventional time-of-flight measurement mentioned above, a physically separate rangefinder could be used and obtained target ranges could be manually input. Alternatively, the imaging system controller 24 could automatically walk the range gate out in distance and an operator could observe and cue the system to pause when an object of interest (i.e., a target) is observed.

With knowledge of the distance (or range) to the target 14, time-gating of image collection can be performed using a mid-wave imaging camera 18. By gating the imaging camera 18 to detect reflected light only when the short pulse light reflected from the target 14 is incident on the camera, and not during other periods when shorter/longer range background reflections are present, backscattering from other objects or obscurants is largely eliminated from the image. This improves image contrast dramatically, with corresponding increases in range performance. In one embodiment, the gated imaging camera 18 can be a mid-wave gated Indium Antimonide (InSb) camera. Compared to other illuminated IR sensor technologies, InSb cameras are reliable and cost effective. A 640×480 focal plane array, with a readout integrated circuit capable of selecting and gating out particular time intervals of less than 5 microseconds, provides the capability for capturing flash images of the desired target and suppressing extraneous optical backscatter. In other embodiments, alternative focal plane materials, such as mercury cadmium telluride (HgCdTe), or formats, such as 320×240 or 512×512, may be employed. Gating may be achieved by a variety of techniques, which include varying the intrinsic sensor gain (e.g., for embodiments using EBCCD, PMT, APD) by bias voltage control or by control of readout timing. While gating may be advantageous as noted above, the camera of some embodiments of the present invention need not include time gating.

Regardless of whether or not the image is gated, the camera captures an image based upon the returning MWIR signals. Target images captured or collected by the mid-wave imaging camera 18 may be processed by the digital image processing module 20 to improve image quality. In one embodiment, the digital image processing module 20 is comprised of support electronics that include analog and digital features for allowing manipulation of the camera output from single or multiple frames to enhance the target image. Standard image processing techniques that may be used include threshold and gain adjustments, edge enhancement, active/passive image fusion, and local area contrast enhancement, to name just a few. In other embodiments, use of real-time processors or data acquisition systems with post-processing are both feasible, with varying levels of automation or user control over the algorithms which are applied.

Figure 2:
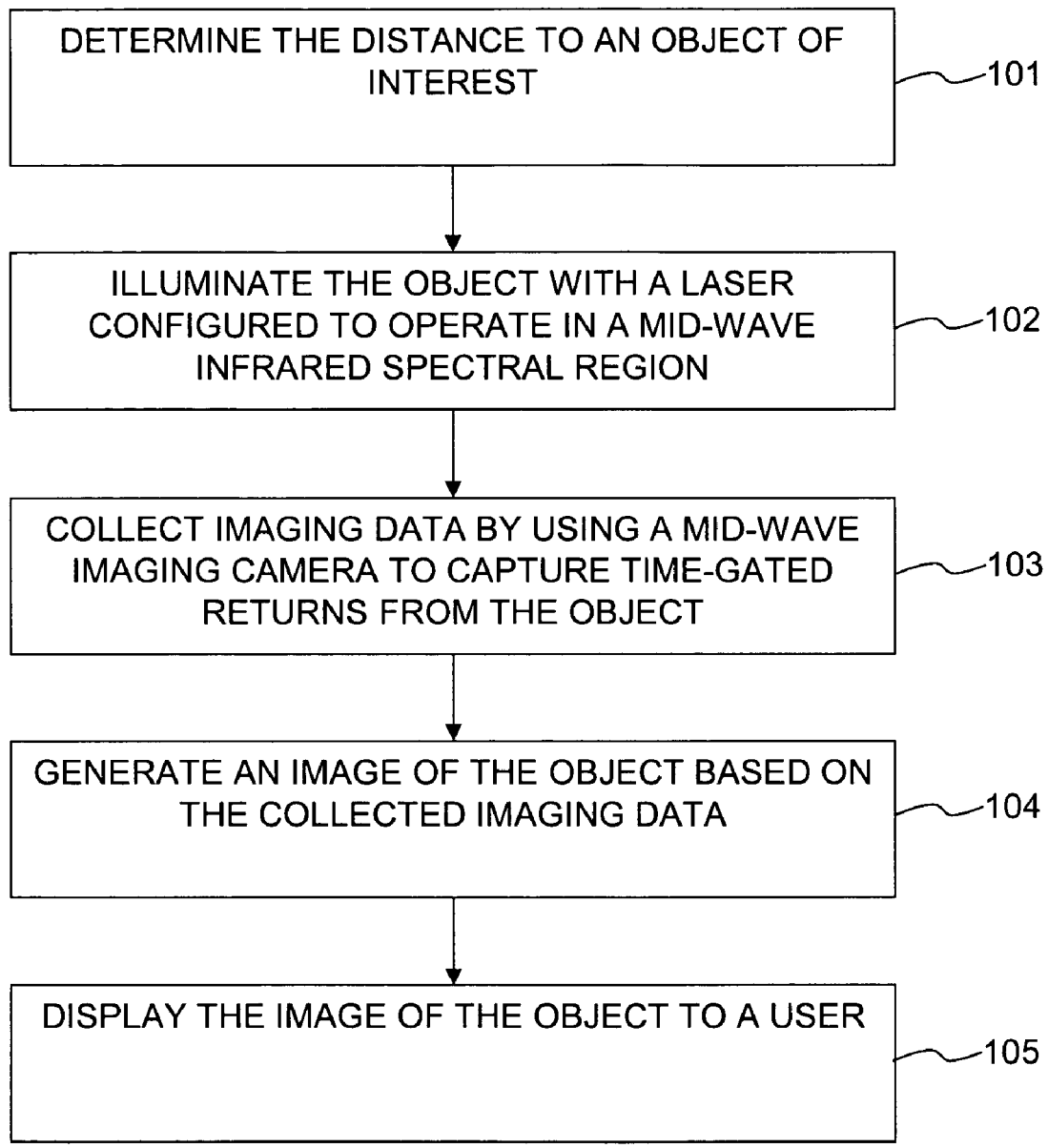
FIG. 2 shows a process flow diagram that illustrates the steps for using the imaging system of FIG. 1 to form an image of a target in accordance with one embodiment of the present invention.

FIG. 2 shows a process flow diagram that illustrates the steps for using the imaging system of FIG. 1 to form an image of a target in accordance with one embodiment of the present invention. At step 101, the system 10 determines the distance or range to an object of interest or target 14. In one embodiment, this is accomplished by using a range receiver 16, which can be a high-speed, single element mid-infrared detector that may be used in conjunction with bias and threshold circuitry to measure the time-of-flight of one or more pulses occurring prior to the pulses used to collect imaging data. However, as indicated above, a variety of other range measurement approaches may be applied as well. For example, a physically separate rangefinder could be used and target ranges obtained with the separate rangefinder could be manually input.

At step 102, the target 14 is illuminated by a laser 12 that operates in the mid-wave infrared spectral region. Specifically, one or more short pulses of light can be actively transmitted towards the target 14 by a MWIR laser 12 operating in the 3-5 μm wavelength range. In one embodiment, the laser 12 can be either a Q-switched Ho:BYF or Ho:YLF 3.9 μm laser. Q-switching or short pulse laser operation would allow the laser to be used for target discrimination behind closely-spaced obscurants, such as camouflage nets. Alternative embodiments may include other types of mid-IR lasers, such as non-Q-switched variants of the lasers mentioned above, frequency doubled $CO_2$ lasers, Nd:YAG lasers with outputs shifted to the mid-IR using nonlinear crystals such as KTP, KTA or PPLN, and other lasers which are nonlinearly shifted from near- or mid-IR wavelengths into the 3-5 μm spectral range.

The process then proceeds to step 103, where the system 10 uses a mid-wave infrared imaging camera 18 to perform image collection of the object. By gating (i.e., turning on) the mid-wave imaging camera 18 to detect reflected light only when the short pulse light reflected from the target 14 is incident on the camera, and not during other periods when shorter/longer range background reflections are present, backscattering from other objects or obscurants is largely eliminated from the image. This improves image contrast dramatically, with corresponding increases in range performance. In one embodiment, the gated imaging camera 18 can be a mid-wave gated Indium Antimonide (InSb) camera. In another embodiment, the gated imaging camera 18 can be a mid-wave gated mercury cadmium telluride (HgCdTe) camera. Such cameras may include a focal plane array, with a readout integrated circuit capable of selecting and gating out particular time intervals of less than 5 microseconds, which provides the capability for capturing flash images of the desired target 14 and suppressing extraneous optical backscatter. The readout integrated circuit may include the capability to record and later read out the returns from multiple range bins associated with different respective time intervals.

At step 104, the system uses the imaging data collected by the mid-wave imaging camera 18 to generate an image of the target 14. In some cases, image generation may involve little more than placing the raw imaging data in an appropriate format for presentation to an operator via a display device 22. However, in other cases, images or frames captured by the camera 18 may be processed by a digital image processing module 20, which, in one embodiment, can be comprised of support electronics that include analog and digital features for allowing manipulation of the camera output from single or multiple frames to enhance the target image. Standard image processing techniques that may be used to enhance a target image include, but are not limited to, threshold and gain adjustments, edge enhancement, active/passive image fusion, and local area contrast enhancement. At step 105, the image of the target 14 can be displayed to a user via the display device 22.

Figure 3:
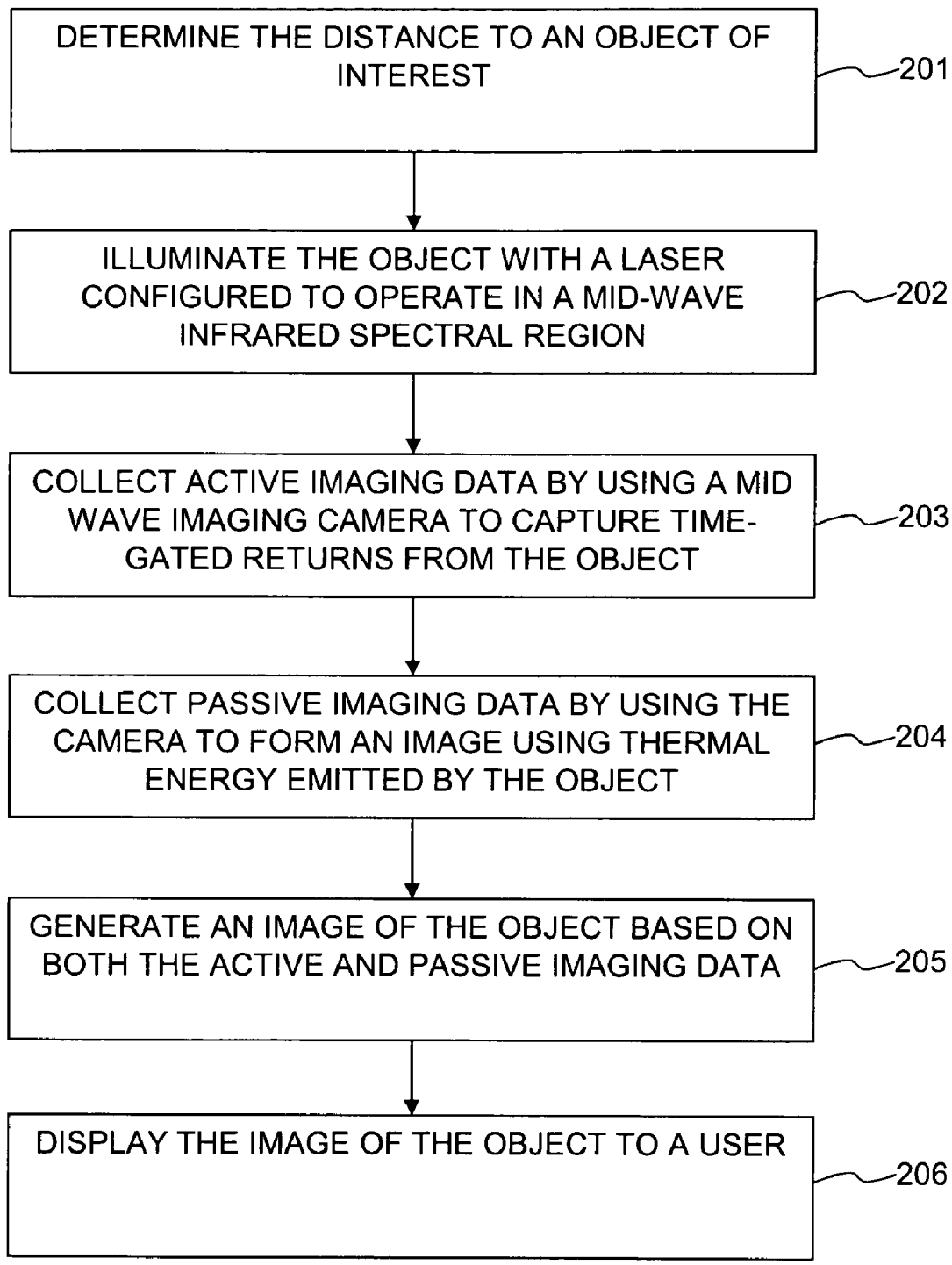
FIG. 3 shows a process flow diagram that illustrates the steps for using the imaging system of FIG. 1 to form an image of a target in accordance with another embodiment of the present invention.

FIG. 3 shows a process flow diagram that illustrates the steps for using the imaging system of FIG. 1 to form an image of a target in accordance with another embodiment of the present invention. In this embodiment, the system 10 can be configured to operate as a dual-mode (active/passive) system. Advantageously, the dual-mode (active/passive) system can be operated in both a normal passive FLIR (Forward Looking Infrared) mode, and in an active illuminated mode as described above. Since the passive and active modes of operation utilize entirely different phenomenology (i.e., reflected energy vs. emitted energy), each of which may emphasize different target features, the combination of images generated in these two modes may permit recognition and identification of targets at longer ranges than either of the two modes separately.

At step 201, the system 10 determines the distance or range to an object of interest or target 14. In one embodiment, this is accomplished by using a range receiver 16, which can be a high-speed, single element mid-infrared detector that may be used in conjunction with bias and threshold circuitry to measure the time-of-flight of one or more pulses occurring prior to the pulses used to collect imaging data. At step 202, the system is operating in an active mode, where, during a first time period, the system illuminates the target 14 with one or more pulses of light generated by the laser 12. As indicated above, the laser 12 is configured to operate in a mid-wave infrared spectral region. In one embodiment, the laser 12 can be a 3.9 µm laser that includes or works in connection with a variable divergence mechanism (i.e., a beam forming mechanism). As would be understood by one of ordinary skill in the art, a variable divergence mechanism allows the energy density at the target 14 to be optimized based on range. For long ranges, the divergence is narrow to get the maximum energy on the target. At shorter ranges, the divergence is wider to prevent saturation of the camera 18.

While still in the active mode, the system of this embodiment, at step 203, uses the mid-wave infrared imaging camera 18 to perform time-gated image collection of returns from the target 14. By gating (i.e., turning on) the mid-wave imaging camera 18 to detect reflected light only when the short pulse light reflected from the target 14 is incident on the camera, and not during other periods when shorter/longer range background reflections are present, backscattering from other objects or obscurants is largely eliminated from the image. This improves image contrast dramatically, with corresponding increases in range performance.

At step 204, the system is operating in a passive mode, where, during a second time period when the target 14 is not being illuminated by the laser 12 (which may occur prior to and/or after the active mode), the system collects passive imaging data of the target. This can be accomplished by using the mid-wave imaging camera 18 to form an image using natural thermal energy emitted by the target. In one embodiment, a filter wheel allows the receiver portion of the imaging camera 18 to operate over a full 3 to 5 micron bandpass in the passive mode, and over a narrow bandpass (e.g., 3.85-3.95 µm) in the active mode. Other MWIR bands may be utilized and other types of filters may be employed depending upon the application. The timing aspects of image collection can also be controlled to match the mode of operation. For example, in one embodiment, the integration time in the passive mode can be in the 3 to 30 millisecond range, while in the active mode, the integration time would be matched to the laser pulse width and the desired range depth of the image. As would be understood by one of ordinary skill in the art, matching the spectral bandpass and integration time to the laser allows the signal-to-noise ratio (SNR) to be maximized.

At step 205, the system can be configured to use both the active imaging data and the passive imaging data collected by the mid-wave imaging camera 18 to generate an image of the target 14. Passive and active images can be fused to provide additional information versus that of a single sensor alone. When operating in this configuration, the system 10 is advantageous in that, since the same optics and camera 18 capture both passive and active images, thereby avoiding the cost incurred to utilize additional equipment while also avoiding any alignment, sizing and/or warping of the images prior to fusing or other display. Images or frames captured by the camera 18 in either or both modes may be processed by a digital image processing module 20. In one embodiment, the image processing module 20 registers and averages several frames from the camera 18, thereby reducing noise from speckle and any other uncorrelated noise sources. The image processing module 20 may also perform histogram processing to optimize the image for operator display. Accordingly, at step 206, the image of the target 14 can be displayed to a user via a display device 22. While the active and passive images may be separately displayed, the active and passive images of the same scene may be concurrently displayed since some features of the scene may be more visible in the active image while other features of the scene may be more visible in the passive image. In order to convey the origin of the various features of the scene as being from the active image or the passive image, the composite image may be displayed with those features originating from the active and passive images being visually distinguished, such as in terms of separate colors, shading, hatching or the like. For example, an RGB composite image may be generated in which the red component for each feature originates from the active image, the blue component originates from the passive image, and the green component results from an arithmetic combination of the two images. Thus, the resulting imagery of a dual-mode system may be more robust without requiring much, if any, additional equipment.

Figure 4A:
FIGS. 4a, 4b and 4c are passive, active and composite images captured in accordance with one embodiment of the present invention.
Figure 4B:
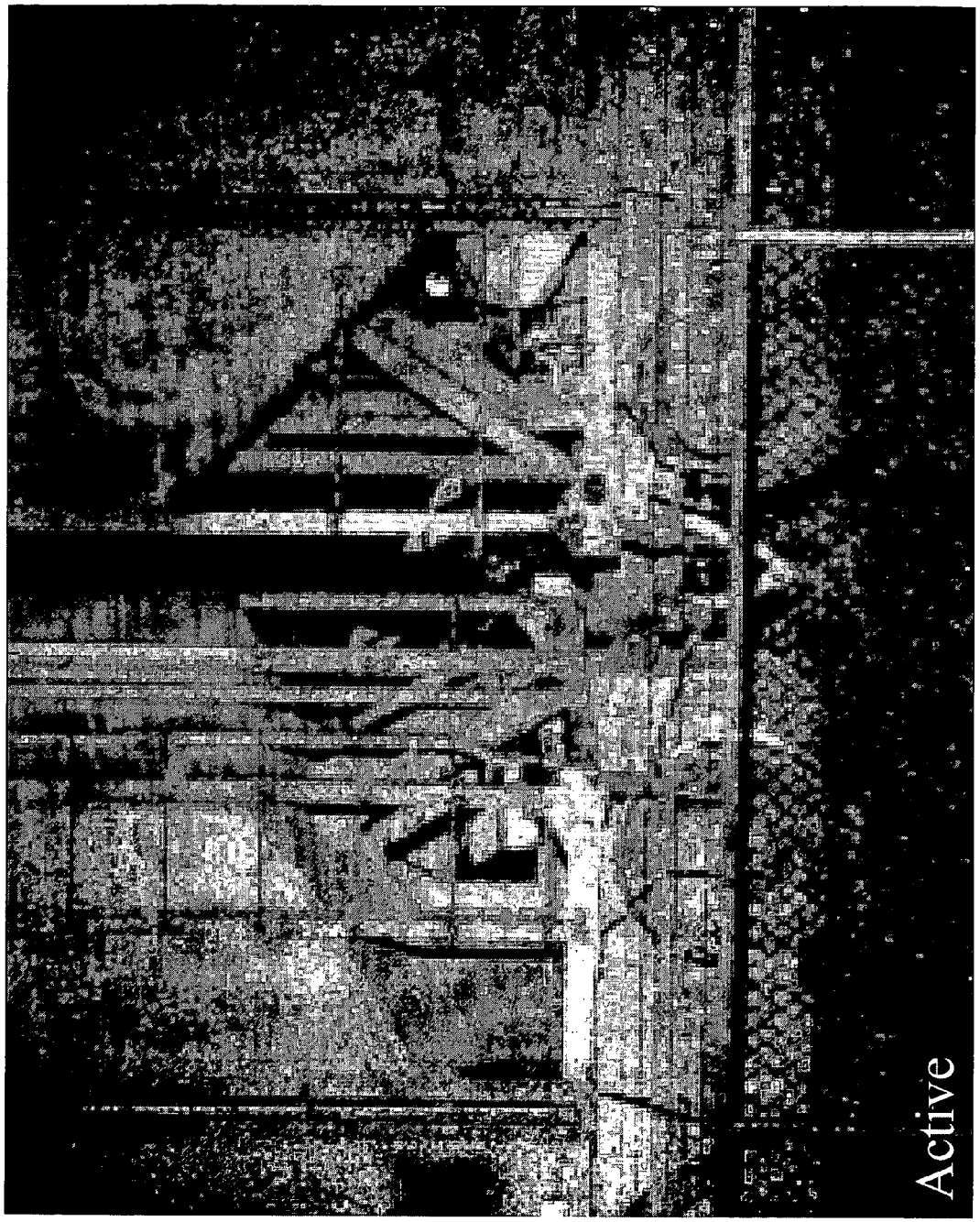
Figure 4C:

By way of example, FIGS. 4a and 4b depict passive and active images, respectively, of an automobile. In this exemplary embodiment, the passive and active images are obtained by the same mid-wave imaging camera 18 with the active image resulting from illumination of the automobile and its surroundings with MWIR signals generated by a MWIR laser 12 while the MWIR signals that define the passive image were independent of any illumination by the MWIR laser. As will be noted, certain features are depicted more clearly and/or in more detail in the passive image of FIG. 4a while other features are depicted more clearly and/or in more detail in the active image of FIG. 4b. The image processing module 20 may also combine the passive and active images and create a composite image as shown in FIG. 4c having features that originate from either one or both of the passive and active images in order to provide an even more detailed and informative image. For illustration, FIG. 4c shows a composite image that combines image information from the gray-scale passive image and the gray-scale active image. Alternative methods for combining the gray-scale passive image and the gray-scale active image into a false-color composite image would also be easily implemented by those skilled in the art.

As noted above, active images and, correspondingly, the resulting composite images may include details or other imagery information that is missing from passive images of the same scene. While this additional information may be generally useful, this additional information may prove invaluable in conjunction with the flight of helicopters or other air vehicles at relatively low altitudes in the vicinity of wires, towers and other obstacles. In this regard, wires and other obstacles may be difficult to identify from passive images, especially at dawn or dusk or during rainfall or in the presence of fog or other obscurants, and may therefore pose a significant risk to helicopters or other aircraft during low altitude flight. However, active images as well as the resulting composite images may depict the wires, towers and other obstacles more clearly so that helicopters and other air vehicles can more easily and safely avoid the obstacles.

Figure 5A:
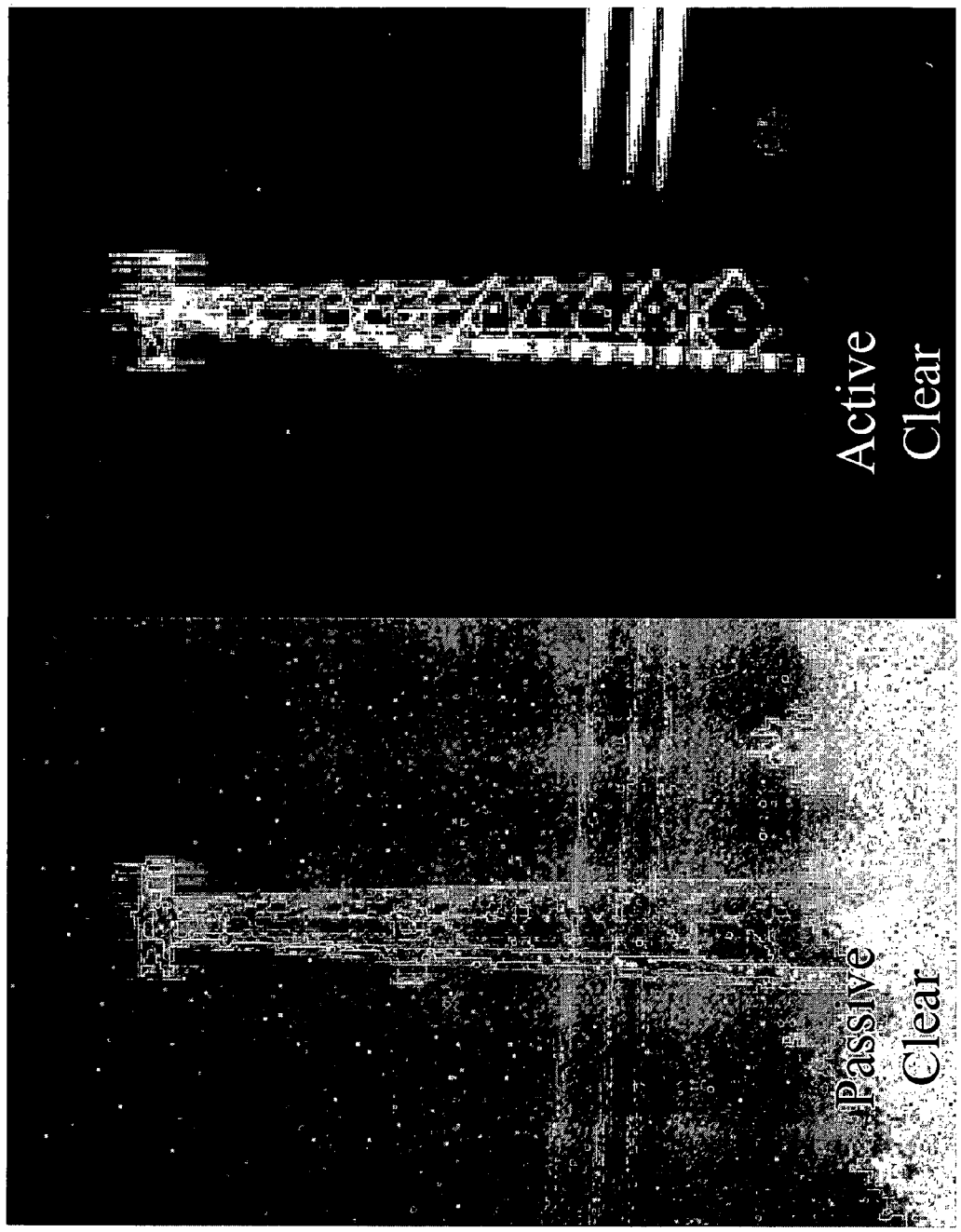
FIGS. 5a and 5b are passive and active images captured in accordance with one embodiment of the present invention, in a clear atmosphere (FIG. 5a) and during rainfall (FIG. 5b).
Figure 5B:
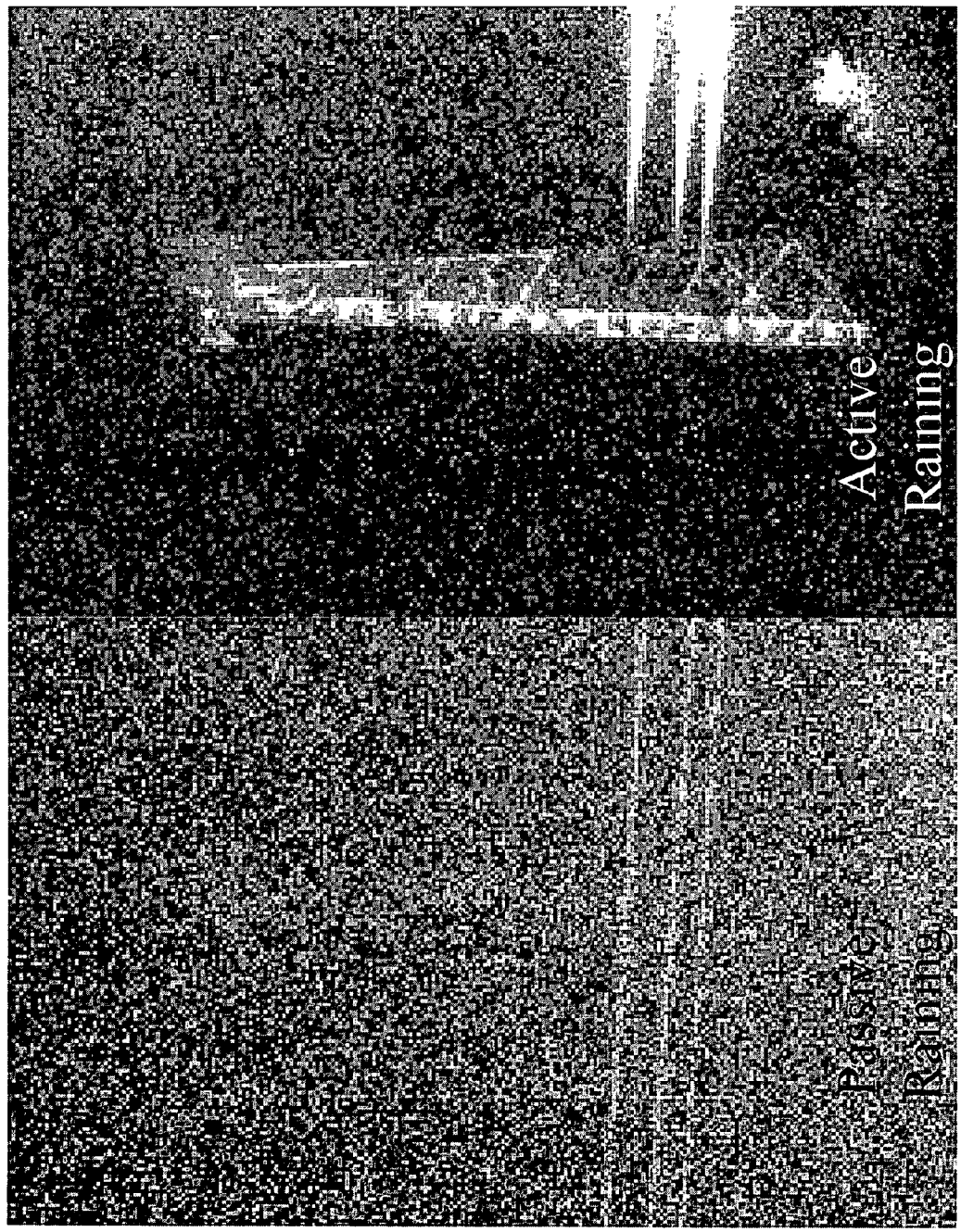

The ability of the system and method of one embodiment of the present invention to detect and image obstacles even in the presence of obscurants is illustrated in FIG. 5. In this exemplary embodiment, the passive and active images are obtained by the same mid-wave imaging camera 18 with the active image resulting from illumination of the cellphone tower and its surroundings with MWIR signals generated by a MWIR laser 12 while the MWIR signals that define the passive image were independent of any illumination by the MWIR laser. As will be noted, when the atmosphere is clear (FIG. 5a), the tower is visible in both the active and the passive image, whereas during rainfall (FIG. 5b) the cellphone tower is only visible in the active image.

While the foregoing system 10 employs a laser 12 in the active mode that emits signals in the MWIR range so that the same mid-wave imaging camera 18 can advantageously be utilized in both the active and passive modes, other embodiments of the system may actively illuminate the target 14 with signals having a different wavelength and, in one embodiment, with shortwave infrared (SWIR) signals such as signals having a wavelength of less than 3 micrometers and, more typically, between 1.0 and 2.5 micrometers. As such, the system of this embodiment would have a laser capable of emitting SWIR signals, such as an OPO-shifted Nd:YAG laser, and a single imaging camera such as a HgCdTe focal plane array capable of capturing SWIR signals returning from the target during the active mode, as well as a passive thermal mid-wave images during the passive mode. Notably, the camera for capturing the active SWIR and passive MWIR signals is the same, single camera. Based upon the signals captured by the camera, the image processing module 20 can create a passive image, an active image and a composite image as described above which may depict still additional features of the target as a result of the different wavelengths employed. As such, the system of this embodiment could support an active SWIR/passive MWIR dual regime system while still enjoying the advantages of utilizing only a single camera.

Many modifications and other embodiments of the invention set forth herein will come to mind to one skilled in the art to which the invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for observing an object at an extended distance, the system comprising:
    a range receiever for determining a distance to the object, wherein said range receiver comprises a mid-wave infrared detector configured to (a) measure a time-of-flight of one or more pulses occurring prior to collecting imaging data and provide updates to the measurement of distance during the collection of imaging data to dynamically adjust to changes in the distance to the object being imaged, (b) independently measure the distance to the object while imaging it and provide updates to the measurement of distance during the collection of imaging data dynamically adjust to changes in the distance to the object being imaged;
    a laser for illuminating the object with a signal (a) from within a mid-wave infrared spectral region in a 3 to 5 micron wavelength range, (b) having wavelength outputs that match peaks of mid-infrared atmospheric transmission windows of 3 to 5 microns, (c) with high pulse energies that permit imaging at an extended distance; and (d) that operates in Q-switched regime to provide high energy illumination pulses of short duration for gated imaging;
    a mid-wave imaging camera, capable of operating in a dual-imaging mode, for collecting imaging data of the object in the mid-wave infrared spectral region in both a mid-wave infrared laser-illuminated imaging mode and a mid-wave infrared thermal imaging mode, wherein said mid-wave imaging camera is configured for:
        in the mid-wave infrared laser-illuminated imaging mode, capturing imaging data during a time interval when signals emitted by said laser and reflected by the object are incident upon said camera based on the distance as determined by range receiver, and
        in the mid-wave infrared thermal imaging mode, capturing mid-wave infrared thermal imaging data and detecting a thermal contrast of a target scene caused by differences in emissivity and temperature of objects of the target scene, and
    a controller for coordinating operations associated with the laser, a sequencing of the laser output with the range receiver, the mid-wave imaging camera, an image processing module, and a display device, wherein the controller coordinates the operations of the mid-wave imaging camera to capture both (a) imaging data that is responsive to illumination of the object by the signals provided by laser in the mid-wave infrared laser-illuminated imaging mode of operation and (b) imaging data associated with the object in the mid-wave infrared thermal imaging mode of operation that is independent of illumination of the object by the signals provided by the laser in the mid-wave infrared laser-illuminated imaging mode of operation.

2. The system of claim 1, wherein said laser is at least one of a pulsed Ho:BYF laser, or a pulsed Ho:YLF laser, wherein said laser (a) has a wavelength output of about 3.9 microns that matches a highest tranmission in the mid-infrared atmospheric transmission window of 3 to 5 microns; (b) produces high pulse energies that permit imaging at an extended distance; and (c) operates in a Q-switched regime to provide high energy illumination pulses of short duration for gated imaging.

3. The system of claim 1, wherein said laser is at least one of a frequency doubled $CO_2$ laser or a Nd:YAG laser in combination with a nonlinear crystal for shifting the wavelength of for shifting the wavelength of the output signal (a) with outputs that match peaks in the mid-infrared atmospheric transmission window of 4 to 5 microns and 3 to 4 microns respectively, and (b) produces high peak power illumination pulses that permit imaging at and extended distance.

4. The system of claim 1, wherein said camera is a gated InSb or HgCdTe camera having a focal plane array, with a readout integrated circuit capable of intergration times in low-gain mode for passive imaging that are longer than the intergration times in a high-gain mode for gated active imaging.

5. The system of claim 1, wherein said controller is capable comprises an interface and timing electronics that include pulse generators and digital delay timers configured for (a) coordinating a sequencing of the laser output with the range receiver and the gating of the mid-wave imaging camera to collect individual imaging frames, (b) providing dynamic adjustment of the range gate delay based on updated real-time target range measurements from the range finder by automatically walking the range gate out in distance when an object of interest moves or when the system scans across a scene with objects at various distances in line of sight.

6. The system of claim 5 further comprising a display device capable of (a) displaying the image of the object that is concurrently comprised of imagery data collected while in both the mid-wave infrared laser-illuminated imaging and mid-wave infrared thermal imaging modes of operation, and (b) visually distinguishing through the use of color extent to which each feature in the image is based on imagery data collected in the mid-wave infrared laser-illuminated imaging mode of operation versus being based on imagery data collected in the mid-wave infrared thermal imaging mode of operation.

* * * * *

UNITED STATES PATENT AND TRADEMARK OFFICE
CERTIFICATE OF CORRECTION

PATENT NO.        : 7,541,588 B2
APPLICATION NO.   : 11/179856
DATED             : June 2, 2009
INVENTOR(S)       : Tabirian et al.

Page 1 of 1

It is certified that error appears in the above-identified patent and that said Letters Patent is hereby corrected as shown below:

Column 10,
Line 23, "receiever" should read --receiver--;
Line 30, after "(b)" insert --or--;
Line 33, after "data" insert --to--;
Line 41, after "in" insert --a--;
Line 54, after "by" insert --the--;
Line 67, after "by" insert --the--.

Column 11,
Line 10, "tranmission" should read --transmission--;
Line 19, delete "for shifting the wavelength of" (repetitive);
Line 23, "and" should read --an--;
Line 26, "intergration" should read --integration--.

Column 12,
Line 1, before "low" insert --a--;
Line 2, "intergration" should read --integration--;
Line 4, delete "is capable";
Line 9, "imaging" should read --image--;
Line 20, after "color" insert --the--.

Signed and Sealed this

Tenth Day of November, 2009

David J. Kappos
*Director of the United States Patent and Trademark Office*